Nov. 3, 1964          J. H. ANDRESEN, JR          3,154,948
                            ALTIMETER
Filed Jan. 14, 1963                         3 Sheets-Sheet 1
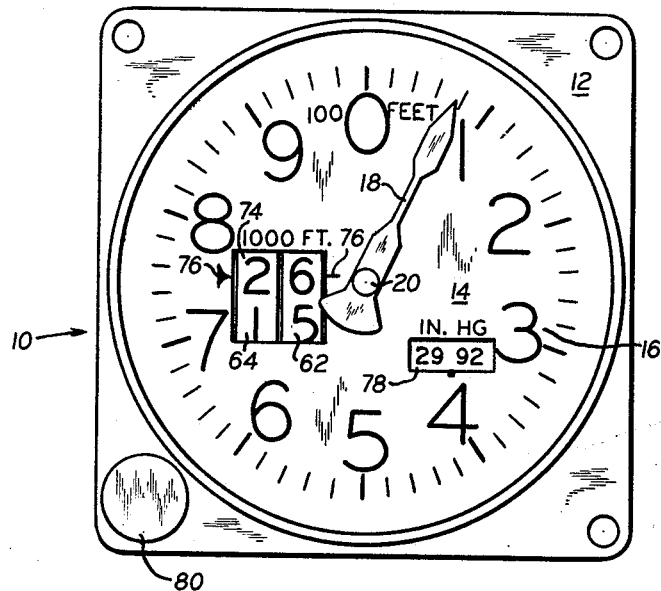
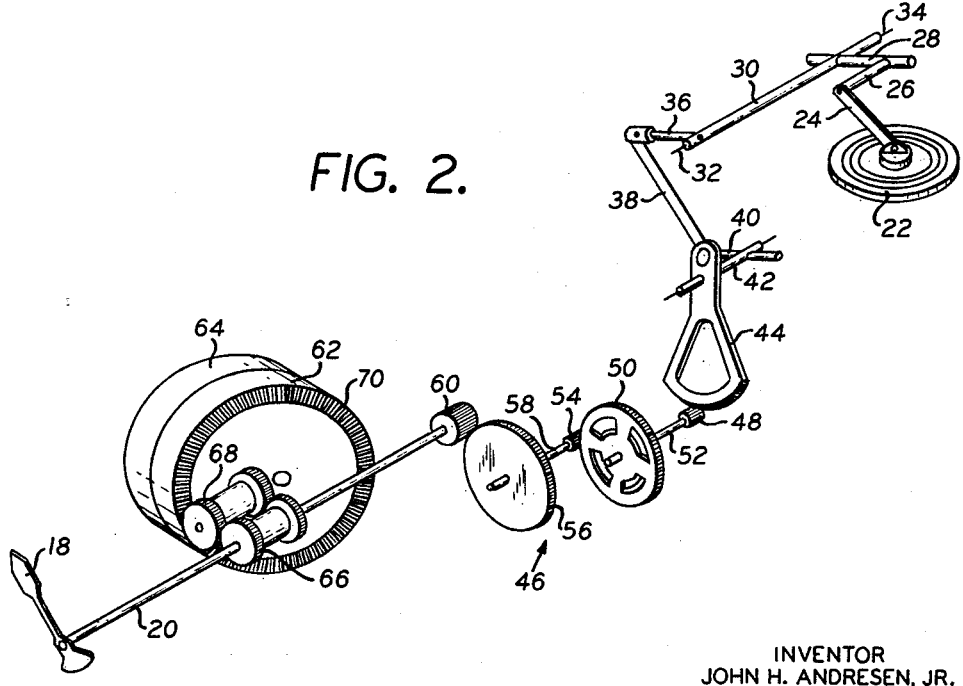
INVENTOR
JOHN H. ANDRESEN, JR.
BY
ATTORNEYS.

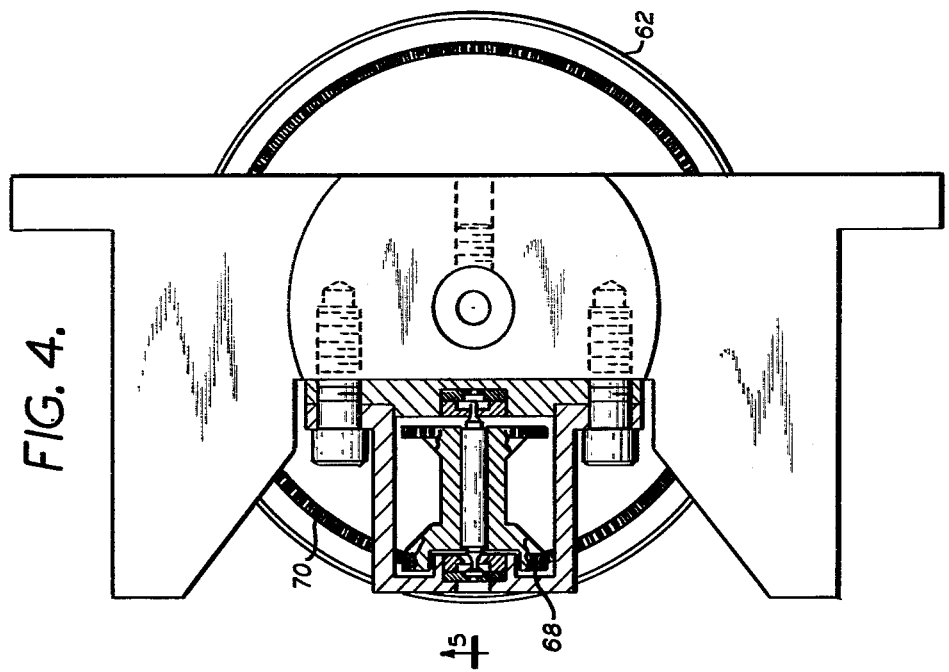
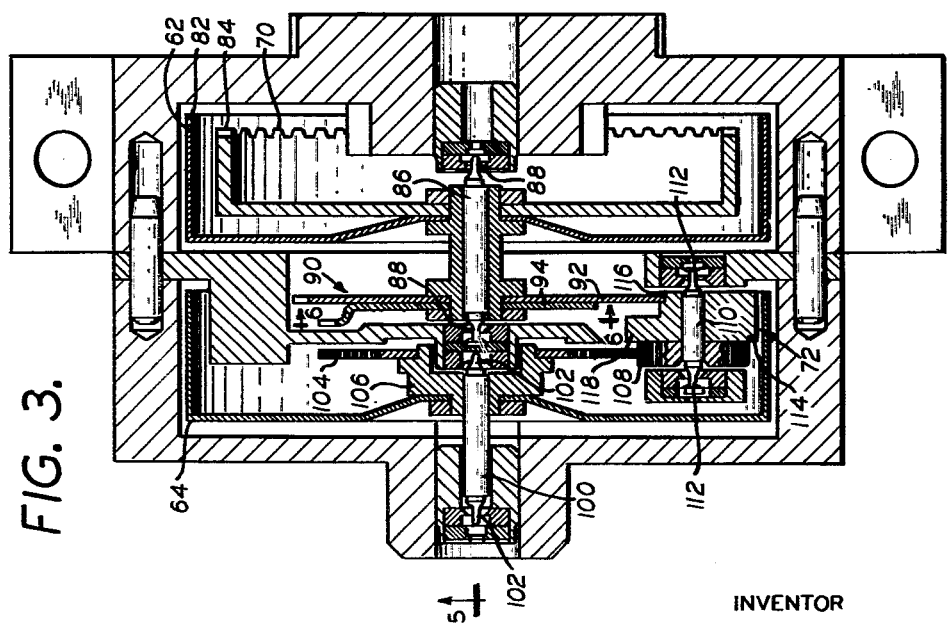

Nov. 3, 1964  J. H. ANDRESEN, JR  3,154,948
ALTIMETER
Filed Jan. 14, 1963  3 Sheets-Sheet 3

INVENTOR
JOHN H. ANDRESEN, JR.
BY
*Hubbell, Cohen & Stiefel*
ATTORNEYS.

3,154,948
ALTIMETER
John H. Andresen, Jr., Hewitt, N.J., assignor to Astek Instrument Corp., Armonk, N.Y., a corporation of New York
Filed Jan. 14, 1963, Ser. No. 251,204
6 Claims. (Cl. 73—386)

This invention relates to altimeters and particularly to a mechanism for actuating display means on an altimeter.

In the use of aircraft altimeters, the display of the indicia is extremely important. That is to say, the indicated altitude must be readily readable in order for the altimeter to satisfactorily perform. Anything on the altimeter which tends to make it difficult to read and hence tends to give rise to errors in reading is undesirable. Further, the reliability of altimeters is extremely important as the consequences of inaccurate indications are manifold and apparent.

It has heretofore been known to provide an altimeter with a circular dial representing a thousand feet of altitude, calibrated in ten increments of one hundred feet and subdivisions thereof, which dial cooperates with a pointer that rotates in accordance with altitude. For altitude increments above a thousand feet there is provided a drum which has indicia inscribed thereon, which drum may be viewed through an aperture in the circular dial and which drum will give readings in thousands of feet. Further, a second drum with indicia inscribed thereon is provided to give readings in increments of ten thousand feet. Thus in reading such an altimeter the pilot will view the two drums and get the numbers of thousands of feet and thereafter view the needle cooperating with the circular dial to get the readings in hundreds of feet and sub-divisions thereof.

It has also been known to drive the two drums cooperating with the dial from the shaft on which the pointer or needle is provided. There have been two known fashions of providing the driving of the drums from the shaft. The first of these ways has been through a direct gearing arrangement at a ratio of ten to one. That is to say, a reduction gear arrangement from the shaft to the thousands drum is provided to reduce rotation of the thousands drum to one-tenth the rate of the rotation of the pointer shaft and, further, a second reduction gearing arrangement is provided between the thousands drum and the ten thousands drum to cause the ten thousands drum to rotate at one-tenth the rotation of the thousands drum. While such an arrangement does give a true indication of the altitude, it is extremely difficult to read due to the fact that both drums are constantly rotating and hence are not squarely disposed to give an accurate reading. That is to say, when an aircraft is at, for instance, 15,500 feet, the pointer cooperating with the circular dial will be pointed at the numeral 5 on the circular dial but the thousand feet drum will be halfway between the 5 and the 6 indicia thereon and the ten thousand feet drum will be approximately halfway between the ten thousand and twenty thousand feet indicia thereon. This staggering of indication on both drums has on occasion led to confusion of reading with all the undesirable consequences flowing therefrom.

A second arrangement has been to provide intermittent rotating gearing between the pointer shaft and the thousand feet drum and intermittently acting gearing between the thousand feet drum and the ten thousand feet drum whereby to hold each of the drums at their proper position until they are called upon to move to the next higher or lower position. That is to say, it has been known to provide an intermittently operable gearing arrangement such as, for example, a Geneva drive between the pointer shaft and the thousand feet drum whereby the thousand feet drum does not move at all until the needle has moved through, for example, nine-tenths of a rotation whereupon the gearing will, during the final one-tenth of rotation, drive the thousand feet drum through one-tenth of a rotation to move it to the next higher or lower figure. Concomitantly, a second intermittent gearing arrangement is provided between the thousand feet drum and the ten thousand feet drum to hold the ten thousand feet drum fixed in a predetermined position until the thousand feet drum has gone through nine-tenths of its rotation and upon its rotating through its final tenth of a complete rotation, it will be actuated to move through a tenth of a rotation. This intermittent gearing may also be, and generally is, a Geneva movement. However, such an arrangement, although overcoming the problems of accurate reading present in the direct drive gearing arrangement heretofore mentioned, introduces a relatively large load on the driving mechanism of the altimeter at specific instances which load may cause sticking and hence failure of the altimeter. For example, with a rising or ascending aircraft, if the aircraft is at 19,000 feet and still moving upwardly, the pointer shaft will during the last thousand feet be loaded only by the pointer between 19,000 feet and 19,900 feet but in the last 100 feet as it moves upwardly towards 20,000 feet, the pointer shaft will drive both the Geneva drive between it and the thousand feet drum and the Geneva dirve and the ten thousand feet drum connected thereto whereby to present a relatively large torque load to the shaft. In view of the fact that most altimeters are driven off evacuated altimeter capsules of conventional design, which capsules are capable of exerting only relatively small forces, there is a serious danger of the altimeter failing as the aircraft moves to a ten thousand feet step, e.g., 10,000 feet, 20,000 feet, 30,000 feet, etc.

It is therefore one object of the present invention to provide an altimeter of the type described wherein the ease of reading of the intermittently operable altimeter hereinbefore described is substantially preserved and yet the loading on the altimeter capsule is greatly reduced over that potential loading present in such prior art type altimeters.

In accordance with the present invention the pointer shaft which is actuated through necessary gearing by an altitude capsule is connected to a thousands drum through a continuously acting ten-to-one gearing arrangement and the thousands drum is connected to the ten thousands drum through an intermittently operable gearing arrangement such as a Geneva drive. With such an arrangement the ten thousands drum will always be at the appropriate reading and not moving except during the time the aircraft passes upwardly or downwardly through specific altitudes such as between 9,000 and 10,000 feet or 19,000 and 20,000 feet, etc., and only the thousands drum will be constantly slowly moving. Moreover, and as will be seen hereinafter in the specification, the maximum loading on the capsule with the present invention will be about one-twentieth of the maximum loading on such a capsule in the intermittently operating gearing arrangements hereinbefore described and used.

The above and other objects, characteristics, and features of the present invention will be more fully understood from the following description taken in connection with the accompanying illustrative drawings.

In the drawings:

FIG. 1 is a front elevational view of an altimeter embodying the present invention;

FIG. 2 is a diagrammatic view in perspective of an altimeter mechanism embodying the present invention with certain parts deleted to more clearly illustrate other portions of the mechanism;

FIG. 3 is a vertical sectional view of the drum construction included in the present invention and the drive mechanism therebetween;

FIG. 4 is a fragmentary longitudinal sectional view showing a portion of the drive for the thousands drum in the present invention;

Figure 5:
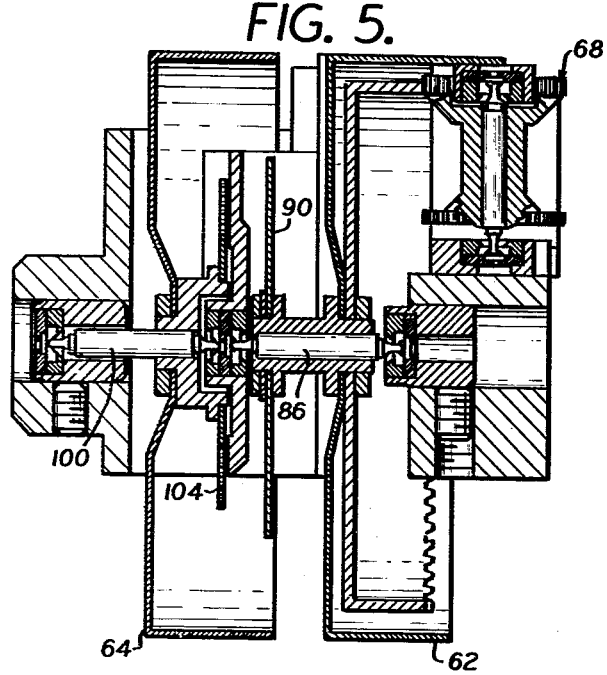
FIG. 5 is a sectional view taken along the line 5—5 in FIG. 3.

Referring now to the drawings in detail and particularly to FIGS. 1 and 2 thereof, the altimeter is generally designated by the reference character 10. It includes a front plate 12 on which is marked a dial 14 calibrated in ten increments of one hundred feet each by the indicia 16. Cooperating with the hundredth dial is a pointer 18 mounted on the pointer shaft 20. The pointer shaft 20 is driven by an evacuated altitude capsule 22 through a linkage including a link 24, a temperature compensating link 26 connected thereto, a rocker link 28 which is secured to a rocker shaft 30 journaled for rotation as at 32 and 34. Secured to the rocker link 30 is a link 36 that is connected to a link 38 which in turn is connected to a driver link 40 fixed to a shaft 42 which also carries a gear segment 44. Upon the altitude of the aircraft increasing the capsule 22 will expand to move upwardly the links 24, 26 and 28 whereby to rotate the rocker shaft 30 and hence swing downwardly the links 36, 38 and 40 to thereby impart rotation to the shaft 42 and the gear segment 44. A reverse movement will occur upon the descending of the aircraft and altimeter. Rotation of the gear segment 44 will be imparted to the shaft 20 through gearing 46 including a gear 48 in meshed relation with the gear segment 44, a pinion 50 mounted on the same shaft 52 as the gear 48, a gear 54 in meshed relation with the gear 50, a pinion 56 mounted on the shaft 58 which also carries the gear 54 and a gear 60 carried by the shaft 20.

Associated with the indicating means of the altimeter 10 is a thousands drum 62 and a ten thousands drum 64 each of which have appropriate indicia thereon. The thousands drum 62 is driven directly from the shaft 20 through a spur gear 66 and an intermediate idler 68, the latter of which is in meshed relation with gear teeth formed in the peripheral side edge of the drum 62, said gear teeth being identified by the reference character 70. Interposed between the drums 62 and 64 is an intermittent gear mechanism 72 here shown as being of the Geneva type.

It will be understood that the drums 62 and 64 are both disposed rearwardly of the dial 14 and only a small portion thereof is viewed as through a cutout or aperture 74 in the dial plate 16. Preferably, although not necessarily, the vertical extent of the aperture 74 is about one and a half times the vertical extent of a given numeral on either of the drums 62 and 64 (that is to say, about 15% of the circumference of the drums) whereby to enable the pilot to view one and a half numerals at all times. To enable the pilot to know which numeral is the dominant or commanding numeral, suitable indexing means such as markers 76 are provided on the dial 14. Accordingly, the altitude shown in FIG. 1 is a little less than 26,100 feet, namely, approximately 26,080 feet. It will also be understood that the altimeter 10 may be provided with a conventional barometric correction scale 78 and associated knob 80.

As shown in FIG. 3, the drum 62 is actually formed of two parts, the outer drum 82 bearing the indicia on its periphery and an inner drum 84 on which is formed gear teeth 70. These two drum portions are pressed onto a shaft 86 which is journaled in bearings 88. Preferably these bearings are of extremely low friction type such as, for example, jeweled bearings. Also mounted on the shaft 86 is the driving portion 90 of the Geneva drive 72, which driving portion as shown herein consists of two parts, a substantially circular plate 92 and an elongated member 94 both of which rotate in unison with the shaft 86. The circular part 90 is provided with a substantially V-shaped cutout or a notch 96 and the elongated driving member 94 is also provided in substantial registry with the notch 96 with its own notch 98.

The ten thousands drum 64 is fixed to a shaft 100 journaled in antifriction or jeweled bearings 102, which shaft also has secured thereto a conventional spur gear 104 as by securement to a collar 106 pressed onto the shaft 100. The gear 104 is in meshed relation with a companion spur gear 108 fixed to a rotatable shaft 110 journaled in jeweled bearings 112. As will be seen hereinafter, the gears 104 and 108 are so arranged that gear 108 turns 3.33 times as fast as gear 104. Also mounted on the shaft 110 is the driven portion 114 of the Geneva drive 72 which driven portion has two parts that are formed integrally with one another. The first of these parts, termed the locking part, is roughly triangular in shape being formed of three concave arcuate sides. This locking part is designated by the reference character 116. Each of the sides 116 is complementary to the arc of the circular plate 90 of the driving member and through most of the rotation of the shaft 86 the two arcs are concurrent. The other part 118 is a toothed wheel here shown as having nine teeth.

Figure 8:
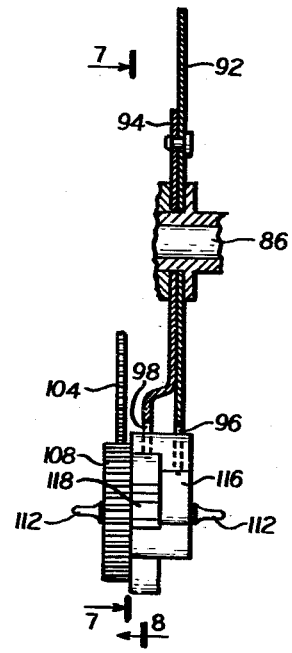
FIG. 8 is a sectional view taken along the line 8—8 in FIG. 7.
Figure 6:
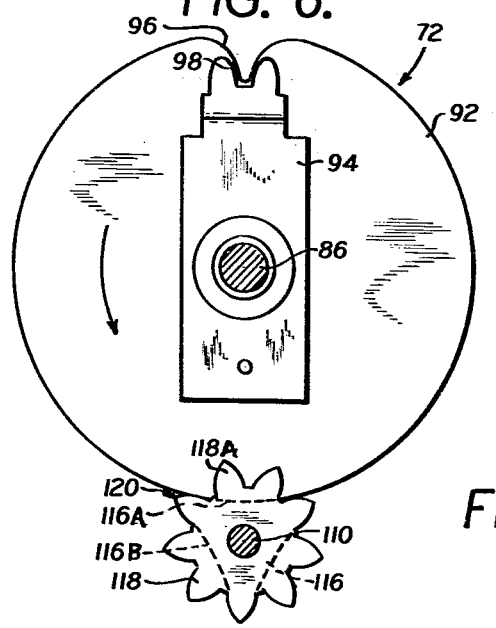
FIG. 6 is a sectional view taken along the line 6—6 in FIG. 3.
Figure 7:
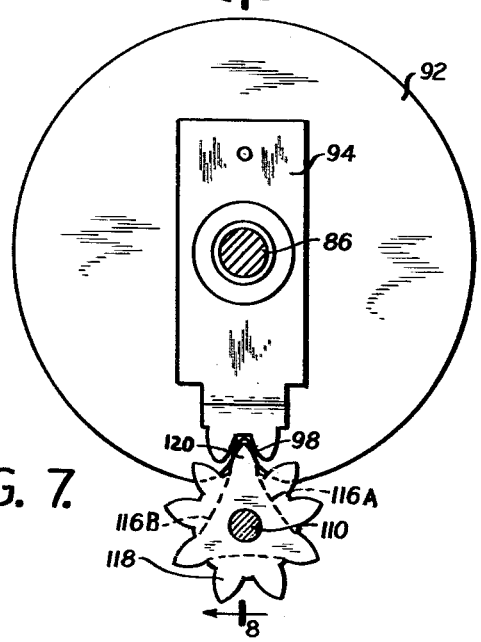
FIG. 7 is a view similar to FIG. 6 but showing the intermittent gearing arrangement between the two drums in driving condition.

With reference to FIGS. 6, 7 and 8, as the shaft 86 is turned by reason of the action of the shaft 20 through the gears 66 and 68 and the toothed portion 70 of the drum 62, the circular portion 92 of the driving part of the Geneva drive 72 will turn and this turning will cause the circular part to slide past one of the arcuate facets 116A of the triangular member 116. However, the concurrence of the arcuate facet 116A with the periphery of the circular member 92 prevents any rotation of the shaft 110 and hence tends to lock the shaft 110 against rotation and therefore locks the ten thousands drum 64 against rotation, this locking being imparted to the ten thousands drum through the gears 104 and 108. However, as the thousands drum commences moving between the 9,000 feet (e.g., 9) number and the ten thousand feet (e.g., zero) number, the notch 96 on the circular member 92 will move into registry with the apex 120 between the facet 116A and the facet 116B of the member 116 whereby to permit rotation of the member 116 and the shaft 110. Concurrently with the unlocking resulting from the registration of the notch 96 with the apex 120, the notch 98 on the driving part of the driving member, that is the notch 98 on the member 94 will engage the tooth 118A of the toothed wheel 118 and continued rotation of the members 94 and 92 in a counter-clockwise direction will impart rotation in a clockwise direction of the members 116 and 118 and the shaft 110 to which they are fixed. At the central part of the engagement of the two members, they will appear as in FIG. 7 with the apex 120 deeply disposed within the notch 96 of the circular member 92 and the tooth 118 in approximate alignment between the two shafts 86 and 110. Further rotation of the driving members in a counter-clockwise relation will impart continued rotation of the driven members in a clockwise direction until the apex 120 becomes disengaged from the moving notch 96 which will occur after shaft 110 has moved through one-third of a revolution. Upon the disengagement occurring, the facet 116B will be coincident with the circular periphery of the plate 92 whereby to relock the shaft 110 against rotation until the shaft 86 will have made substantially another complete rotation which will occur at approximately 9,000 additional feet of altitude. However, during the continued increase in altitude between 9,000 and 10,000 feet beyond that which has just actuated the mechanism, the ten thousand drum will be rotated an additional increment, which increment will be one-tenth of a revolution. It will of course be understood that the one-tenth of a revolution is due to the fact that shaft 110 when it is driven by the Geneva drive rotates one-third of a revolution for one-tenth of a revolution of shaft 86 and since the reduction gearing 104–108 operates on a 3.33 to one ratio, the shaft 100 will during the same time turn one-tenth of a revolution.

From the foregoing it will be seen that as altitude increases (or decreases) there will be a direct driving of the pointer shaft 20 through the linkages and gearing 22–60 which direct and continuous movement will be imparted on a ten-to-one ratio to the thousands drum 62 which will continuously move as the shaft 20 turns but at a rate of one-tenth of the speed. However, during the time that the thousands drum rotates through its last tenth of a complete revolution the intermittent Geneva movement 72 will be actuated to drive the ten thousands drum through a tenth of a revolution whereby to cause it to move upwardly (or downwardly as the case may be) one position. By so arranging the mechanism, it will be seen that the driving or actuating mechanism 22 through 60, inclusive, will be continuously loaded by the drum 62 and will be intermittently loaded by the drum 64 in the Geneva movement. By continuously loading the driving mechanism by the thousands drum, it will be seen that the thousands drum will be rotated during the final 100 feet of a complete rotation of the shaft 20 only one-hundredth of a revolution rather than a tenth of a revolution as is present in the prior art whereby to reduce the maximum torque loading resulting from the driving of the thousands drum by the shaft 20 to one-tenth the maximum torque encountered in the prior art. Further, by rotating the ten thousands drum off the continuously rotating one thousands drum, it will be seen that the ten thousands drum will be rotated one-tenth of a revolution through a full 1,000 feet of rotation (a complete rotation) of the shaft 20 rather than through 100 feet (a tenth of a revolution) of the shaft as was true in the prior art whereby to reduce the loading of the shaft 20 by the ten thousands drum to a value of one-tenth that encountered in the prior art. Accordingly, the loading by the two drums in the present arrangement is one-twentieth the maximum loading encountered in the prior art whereby to substantially reduce the possibilities of excess friction leading to erroneous readings as could be encountered in similar appearing prior art devices.

Notwithstanding this, the simplicity of reading the presentation is fully preserved in the present invention especially when it is realized that the cutout 74 is proportioned to permit the pilot to view only one and a half numerals of each of the two drums 62 and 64 and, further that markers or indicia 76 are provided to point clearly to which numerals are the appropriate ones for reading at any given instance.

Throughout the specification I have described my altimeter as measuring feet. It will be understood that the altimeter may be calibrated in other increments of altitude such as yards, meters, and so forth. Moreover, the system is designed and described as operating on a decimal basis as is preferred. However, it must be recognized that in certain applications other numerical systems may be desirable and the present apparatus can be adapted to them without departing from the scope of the invention.

While I have herein shown and described the preferred form of the present invention, various changes and modifications may be made therein within the scope of the appended claims without departing from the spirit and scope of this invention.

What is claimed is:

1. An altimeter comprising a rotatable shaft, altitude responsive means operatively connected to said shaft for rotating said shaft one revolution for a change of $10^n$ increments of altitude wherein $n$ is an integer, a pointer fixed to said shaft for turning therewith, a face dial disposed in operative relation with said pointer and bearing indicia indicating that one rotation of said pointer represents said $10^n$ increments of altitude, a rotatable drum bearing indicia indicating one complete revolution thereof represents a change of $10^{n+1}$ increments of altitude, a second rotatable drum bearing indicia indicating one complete revolution thereof represents a change of $10^{n+2}$ increments of altitude, continuously acting reduction drive means connecting said shaft to said first drum for continuously driving the said first drum at one-tenth the angular speed of said shaft, and intermittently operable drive means connecting said first drum to said second drum for rotating said second drum one-tenth of a revolution during rotation of said first drum through only a predetermined portion of its rotation.

2. An altimeter comprising a rotatable shaft, altitude responsive means operatively connected to said shaft for rotating said shaft one revolution for a change of $10^n$ increments of altitude wherein $n$ is an integer, a pointer fixed to said shaft for turning therewith, a face dial disposed in operative relation with said pointer and bearing indicia indicating that one rotation of said pointer represents said $10^n$ increments of altitude, a rotatable drum bearing indicia indicating one complete revolution thereof represents a change of $10^{n+1}$ increments of altitude, a second rotatable drum bearing indicia indicating one complete revolution thereof represents a change of $10^{n+2}$ increments of altitude, continuously acting reduction drive means connecting said shaft to said first drum for continuously driving the said first drum at one-tenth the angular speed of said shaft, and intermittently operable drive means connecting said first drum to said second drum for rotating said second drum one-tenth of a revolution during a preselected one-tenth revolution of said first drum and for holding said second drum against rotation through the other nine-tenths of a revolution of said first drum.

3. An altimeter comprising a face dial having circularly arranged indicia calibrated from 0 to $10^n$ increments of altitude, said face dial having a central aperture and a second aperture located between said central aperture and said face dial indicia, a rotatable shaft extending through said central aperture, altitude responsive means operatively connected to said shaft for rotating said shaft one revolution for a change of $10^n$ increments of altitude wherein $n$ is an integer, a pointer fixed to said shaft for rotation therewith in a plane in front of said face dial indicia, whereby a complete revolution of said pointer will indicate a change of $10^n$ increments of altitude, first and second rotatable drums arranged behind said face dial in side-by-side relation with their sides perpendicular to said face dial and their axes of rotation parallel to said face dial, said two drums being in register with said second aperture whereby to render portions thereof viewable therethrough, said first drum bearing indicia indicating that one complete revolution thereof represents a change of $10^{n+1}$ increments of altitude, said second drum bearing indicia indicating that one complete rotation represents a change of $10^{n+2}$ increments of altitude, continuously acting reduction drive means connecting said shaft to said first drum for continuously driving the said first drum at one-tenth the angular speed of said shaft, and intermittently operable drive means connecting said first drum to said second drum for rotating said second drum one-tenth of a revolution during a preselected one-tenth revolution of said first drum and for holding said second drum against rotation through the other nine-tenths of a revolution of said first drum.

4. An altimeter in accordance with claim 3, wherein said drums are substantially identical in size, and said second aperture is of a width substantially equal to the width of said two side-by-side drums and the length of said second aperture is equal to about 15 percent of the peripheral extent of said drums, and indicia disposed on said face dial alongside said second aperture to provide a reference point for reading the indicia on said drums appearing through said second aperture.

5. An altimeter in accordance with claim 3, wherein said continuous acting reduction drive means is gearing, and said intermittently operable drive means is a Geneva drive.

6. An altimeter comprising a face dial having circularly arranged indicia calibrated from 0 to $10^n$ increments of altitude, said face dial having a central aperture and a second aperture located between said central aperture and said face dial indicia and horizontally to the left of said central aperture, a rotatable shaft extending through said central aperture, altitude responsive means operatively connected to said shaft for rotating said shaft one revolution for a change of $10^n$ increments of altitude wherein $n$ is an integer, a pointer fixed to said shaft for rotation therewith in a plane in front of said face dial indicia, whereby a complete revolution of said pointer will indicate a change of $10^n$ increments of altitude, first and second rotatable drums arranged behind said face dial in side-by-side relation with their sides perpendicular to said face dial and their axes of rotation parallel to said face dial, said first drum bearing indicia indicating that one complete revolution thereof represents a change of $10^{n+1}$ increments of altitude, said second drum bearing indicia indicating that one complete rotation represents a change of $10^{n+2}$ increments of altitude, said two drums being of substantially identical size and being in register with said second aperture, said second aperture being of a width substantially equal to the width of said two side-by-side drums and of a length substantially equal to about 15 percent of the peripheral extent of said drums, and indicia disposed on said face dial alongside said second aperture to provide a reference point for reading the indicia on said drums appearing through said second aperture, continuously operable reduction gearing operatively connecting said shaft to said first drum for rotating said drum at one-tenth the angular speed of said shaft, and a Geneva drive operatively connected to said first and second drums for locking said second drum against rotation through about nine-tenths of each revolution of said first drum and for turning said second drum one-tenth of a revolution when said first drum turns through the other one-tenth of its revolution.

No references cited.